United States Patent

[11] 3,560,670

[72] Inventors Roger W. Heyes
Basildon;
Brian W. Richards, Wickford; Alexander
Tait Weir, Bromley, England

[21] Appl. No. 755,583
[22] Filed Aug. 27, 1968
[45] Patented Feb. 2, 1971
[73] Assignee International Standard Electric Corporation
New York, N.Y.
a corporation of Delaware
[32] Priority Sept. 1, 1967
[33] Great Britain
[31] 40,019/67

[54] SUPERVISORY CIRCUIT FOR UNATTENDED REPEATERS
7 Claims, 4 Drawing Figs.

[52] U.S. Cl. .......... 179/175.31
[51] Int. Cl. .......... H04b 3/46
[50] Field of Search .......... 179/175.31

[56] References Cited

UNITED STATES PATENTS

| | | | |
|---|---|---|---|
| 2,890,296 | 6/1959 | Ponthus et al. ............... | 179/175.31 |
| 3,054,865 | 9/1962 | Holloway et al. ............. | 179/175.31 |

*Primary Examiner*—Kathleen H. Claffy
*Assistant Examiner*—Douglas W. Olms
*Attorneys*—W. J. Baum, Cornell Remsen, Jr., Percy P. Lantzy, J. Warren Whitesel and Delbert P. Warner

ABSTRACT: A supervisory system for a plurality of repeaters in a carrier current communication system wherein the transmission path includes a first frequency band to provide operating power for the repeater stations and a second frequency band for transmitting information signals. An interrogation signal separate from the operating power is sent from one terminal station to the nearest repeater station in the first frequency band. The interrogation signal is extracted from the path, delayed a predetermined time interval and then sent to the next repeater station for similar operation on the interrogation signal. In each repeater station, the delayed interrogation signal causes a response signal to be transmitted along the path back to said one terminal station. Said one terminal station counts the number of response signals and measures the amplitude of selected ones of the response signals. If the number of response signals does not equal a predetermined number, an alarm signal is generated indicating a fault in one of the repeater stations. The amplitude measurement will indicate the faulty repeater station due to the amplitude of its response signal not achieving a predetermined amplitude.

Fig.1.

SUPERVISORY CIRCUIT FOR UNATTENDED REPEATERS

This invention relates to supervisory circuit arrangements for Telecommunication systems. More particularly, the invention is concerned with systems of the kind (hereinafter referred to as "communication" systems of the kind specified) in which at least one unidirectional repeater is provided between two terminal stations and in which a single transmission path carries the information signals and the power needed to operate the repeaters. Two such systems arranged to transmit signals in opposite directions constitute a "4-wire bidirectional" system.

Various solutions have been proposed in which faulty repeaters are located by an exchange of interrogation and response signals between a supervising and a supervised station. Such solutions are, however, only possible either in two-wire bidirectional systems, or in 4-wire systems in which at each position to be supervised the "GO" and "RETURN" paths are interconnected. Such arrangements cannot be used on unidirectional channels.

According to the invention there is provided in a carrier current communication system of the kind specified a circuit for supervising remote repeaters in which an interrogation signal lying in a first frequency band is transmitted from a terminal station over the transmission path to the nearest repeater in which said signal is extracted from said path, is delayed by a predetermined interval of time and is injected into the transmission path leading to the adjacent repeater and in which at each repeater the delayed signal initiates a response signal lying in a second frequency band and having a predetermined duration, said response signal being returned to the interrogating terminal over the same transmission path at which terminal means are provided to count the number of received response signals and/or to measure the amplitude of any one of these signals and means to initiate an alarm if either the count or the amplitude of the response signals deviates by more than a prescribed amount, said first frequency band being transmitted by the power supply circuits to the repeaters and said second frequency band being transmitted by the information circuits.

The invention will now be described with reference to the accompanying drawings in which.

Figure 1:
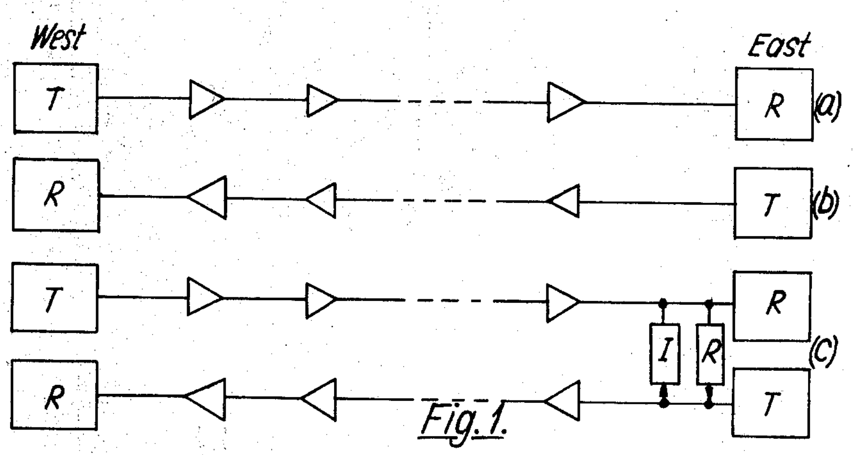
FIG. 1 shows in diagrammatic form the types of systems to which the present invention applies.

The simplest form of a system of the type specified is shown in FIG. 1*a* and comprises a transmit terminal station T, a receive terminal station R and a number of intermediate repeaters. This constitutes a unidirectional system for transmitting information from West to East. If, as indicated in FIG. 1*b* a similar system, but transmitting in the opposite direction is added, a 4-wire bidirectional system results. The transmission path for each direction of transmission can be supervised by a separate supervisory circuit according to the invention in which case the West to East direction is supervised from the East receive terminal and the East to West direction is supervised from the West receive terminal.

A preferred arrangement, however, uses a single supervisory circuit for both directions of transmission by coupling the two paths through filter networks at one terminal station and supervising both tandem connected paths from the receiver at the other terminal station.

The operation of the supervisory circuit arrangement according to the invention is based on the fact that a system which transmits information in one direction only can also transmit supervisory signals in the opposite direction along its power feed circuits in a frequency band which lies below the lowest frequency used in the information channel. Thus, an interrogation signal is transmitted from the supervising terminal via the power feed circuits to all the repeaters and each repeater responds by transmitting to the interrogating terminal an appropriate response signal over the information circuits.

Figure 2:
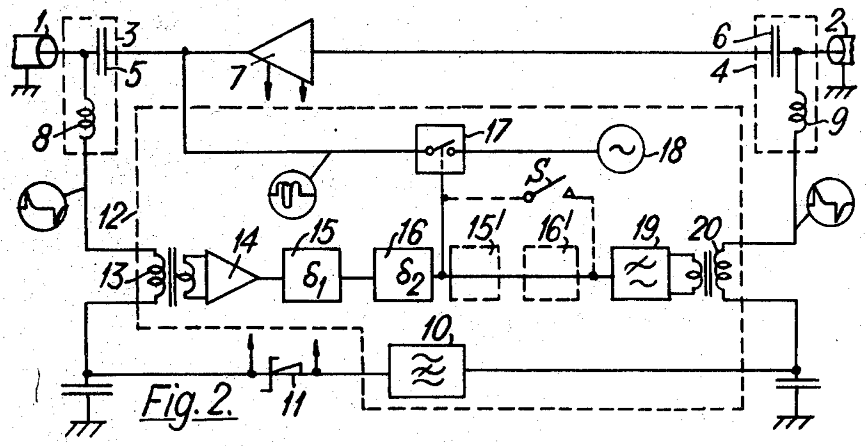
FIG. 2 is a block diagram of the supervisory circuit at a repeater.

The general circuit arrangement at a repeater for one direction of transmission is shown in FIG. 2. The transmission in going West and East of the repeater are indicated by coaxial cables 1 and 2 which carry the information and the power to the repeaters. Power separating filters 3 and 4 are provided at the input and output of each repeater. The information signals lying in a frequency band extending upwards from a lower frequency, for example 60 kc/s are passed by the high pass section of the power separating filter indicated by capacitors 5 and 6 lying in the main transmission path of the amplifier 7.

The power feed circuits comprise the low-pass filter sections represented by inductors 8 and 9, the band stop filter 10 and the zener diode 11.

The supervisory equipment at the repeater is indicated by the dashed box 12. The interrogation signal arriving via cable 1 and low pass filter 8 is picked off by transformer 13 and after amplification in amplifier 14 is used to trigger a first monostable circuit 15 which after a time interval $\delta_1$, for example, 250 microseconds, returns to the initial state thereby triggering a second monostable circuit 16 which relaxes after an interval $\delta_2$, say, 50 microseconds. The output of this second monostable circuit is a direct current pulse of duration $\delta_2$, whose leading edge is delayed by the duration $\delta_1$ relative to the instant when the interrogation signal arrives at the repeater. This pulse closes an electronic switch 17 thereby connecting the output of oscillator 18 to the output of amplifier 7. The frequency of this oscillator lies within the band passed by the information channel and preferably near the upper edge of that band. This response signal has a duration equal to $\delta_2$ and is returned to the interrogating terminal via cable 1.

The direct current pulse at the output of monostable circuit 16 is also applied via filter 19 to primary of transformer 20. In this transformer the pulse is differentiated and the voltage wave appearing in the secondary of the transformer has two sharp spikes of opposite polarity separated by a duration $\delta_2$. The purpose of filter 19 is to restrict the bandwidth of the direct current pulse applied to the transformer to reduce the risk of crosstalk into the information channel. This differentiated pulse is transmitted via low pass section 9 of the power separating filter and line 2 to the adjacent repeater. The frequency of oscillator 18 is the same for all the supervised stations. Bandstop filter 10 is connected in the power supply circuit to prevent the interrogating signal from being transmitted directly through the repeater. The supervisory equipment described with reference to FIG. 2 need not necessarily be located at a repeater, but can be associated with the remote terminal station.

Figure 4:
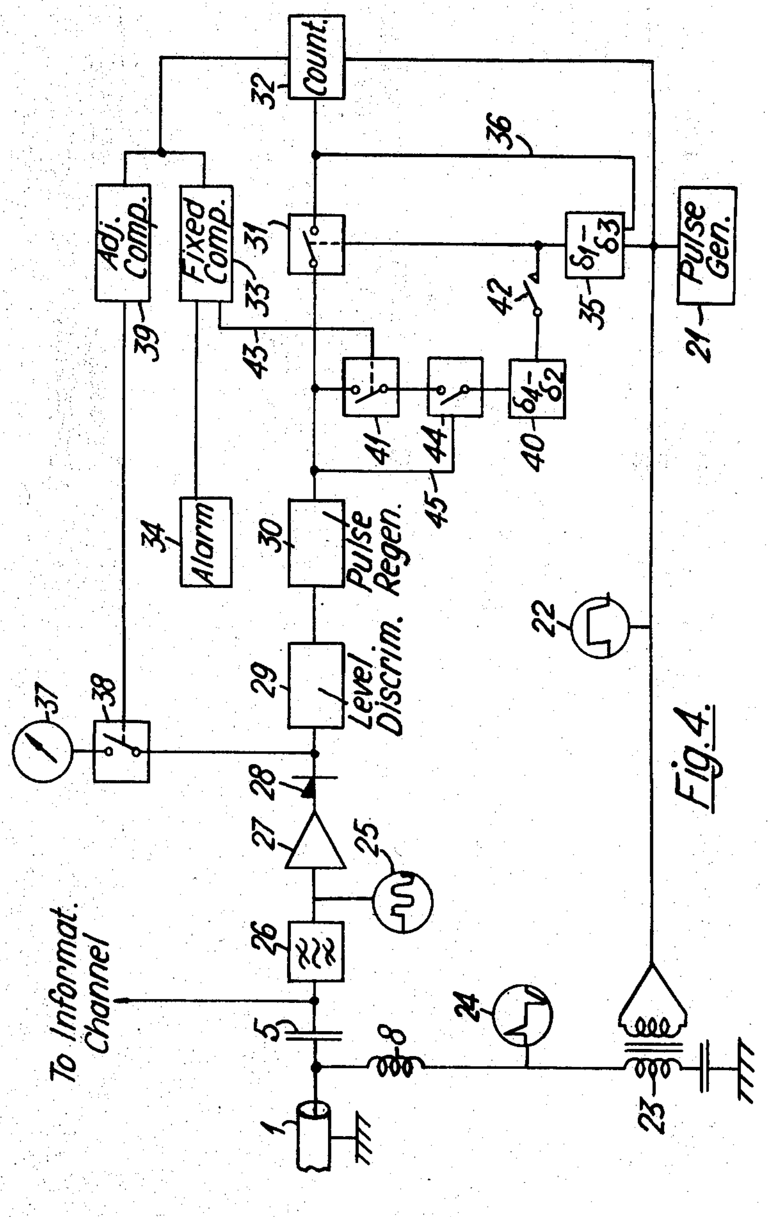
FIG. 4 shows an embodiment of the invention at a supervising terminal station.

The supervisory circuit arrangement at a controlling terminal station will now be described with reference to FIG. 4. The interrogation signal is initiated in the pulse generator 21 which produces at regular time interval $t_1$, for example, every 300 milliseconds, a direct current pulse of short duration $\delta_2$ as indicated at 22. This pulse is applied to the primary of transformer 23 which induces in the secondary a spiking signal shown in 24. This signal is injected into cable 1 via low pass section 8 of the power separation filter. The frequency response of circuits 23 and 8 is made to suppress in signal 24 any high frequency components which would fall within the transmission band of high pass filter 5.

The response signal 25 arriving from a supervised location passes the high pass section 5 of the power separation filter, the band-pass filter 26 and the amplifier 27 and is rectified by detector 28. The rectified signal is taken to a level discriminator 29 which passes only pulses lying within a prescribed range of amplitudes. The pulses which pass the discriminator are reshaped in regenerator 30 and are applied to counter 32 via switch 31. The output of the counter is taken to the fixed predetermined count comparator 33 which is set to the number of positions to be supervised. The circuit is arranged to actuate alarm 34 when the total count registered on counter 32 withing the time interval $t_1$ separating two successive interrogating signals is less than the number preset on comparator 33.

Figure 3:
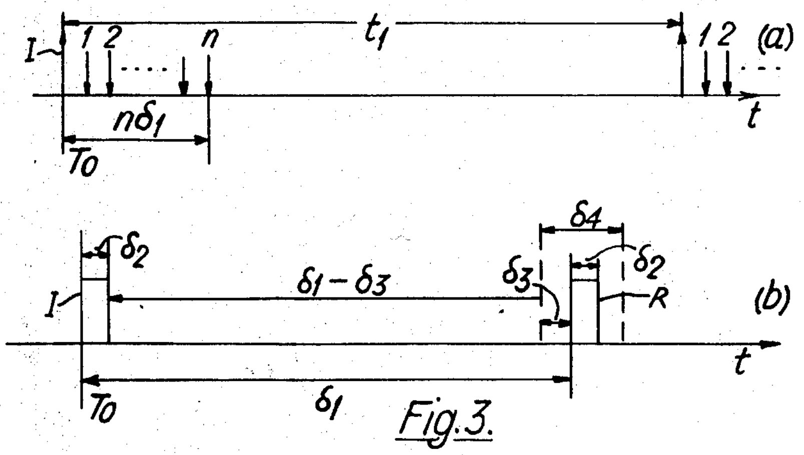
FIG. 3 is a timing diagram to explain the operation of the supervisory circuit.

The timing sequence of signals exchanged between the interrogating terminal and the repeaters is shown in FIG. 3*a*.

At time $T_0$ an interrogation signal indicated by I is generated at the supervising terminal station and is transmitted to the nearest repeater. As already explained the repeater delays this signal by interval $\delta_1$ and returns a response signal to the terminal. Thus, if the system comprises *n* supervised positions the last response signal will be received after an interval of $n\ \delta_1$. The time interval $t_1$ between the transmission of successive interrogation signals is chosen to be substantially longer than the time required for the response signal to arrive from the furthest position to be supervised. In the above timing diagram the time required for the response signal to reach the terminal has been neglected as it is very short compared to the time by which the interrogating signal is delayed at a repeater.

For the purpose of description, $t_1$ has been chosen 300 milliseconds, $\delta_1$ 250 microseconds and $\delta_2$ the duration of a signal 50 microseconds, but other values can be used if required.

In order to reduce the risk of false counts due to noise on the line, the regenerated signals are taken to the counter via switch 31 which is closed just before a response signal is expected to arrive by a signal derived from the direct current pulse produced by generator 21.

The timing of this switch and the operation of the associated circuit will be explained with reference to FIG. 3*b*.

At time $T_0$ a direct current interrogation pulse I is produced by generator 21. As explained previously a response signal delayed by interval $\delta_1$ is returned to the supervising terminal station from the nearest repeater. This received response signal is indicated by R. The direct current pulse is also applied to delay circuit 35 in FIG. 4 which after a delay of ($\delta_1$—$\delta_3$) produces an output pulse of duration $\delta_4$. This output pulse closes the switch 31 of FIG. 4 for a time interval $\delta_4$ thereby allowing the response signal R to pass into the counter 32. The time slot $\delta_4$ is made wider than the duration $\delta_2$ of the response pulses. The switch 31 is closed again for each of the following response signals by feeding back via conductor 36 the last received response signal to the input of the delay circuit 35. Thus, if a response signal fails to arrive switch 31 remains open, the counter stops and the fixed count comparator gives an alarm.

When it is desired to assess the performance of a repeater section, the amplitude of the rectified response signals is measured by means of a peak reading voltmeter 37. The desired pulse is selected from the sequence of received response signals by means of a synchronous switch 38 which is closed by a signal obtained from an adjustable count comparator 39 which is preset to the desired number. Since a single reading is obtained during each time interval $t_1$ separating two interrogating signals, the time constant of the voltmeter must be made sufficiently long to give a steady reading.

The supervisory circuit according to the invention is not limited to the supervision at a location of a single operational parameter, but can be extended to any number of parameters. For example, the functioning of a standby facility can be signalled to the supervising station by including in the circuit of FIG. 2 for each additional parameter to be supervised a further delay circuit comprising units 15' and 16' which are identical with units 15 and 16 and which are connected in front of filter 19 as indicated by dashed boxes. The output of this further delay circuit is connected via switch S to switch 17. Switch S for example a contact of a marginal relay, remains closed when the additional parameter to be supervised is in limits. A fault would open switch S and thereby prevent the transmission of the response signal from the repeater.

Normally these additional supervisory positions would be associated with nondisabling parameters, which when out of limits will not prevent the functioning of the remainder of the system.

If a missing response signal indicates such a nondisabling fault, the situation can arise in which it is desired to measure the amplitude of a response signal originating at a location which lies beyond the nondisabling fault. It is, therefore, necessary insert at the supervising terminal a "synthetic" response pulse to replace the missing pulse. For this purpose a circuit consisting of switches 41,42 and 44 and delay circuit 40 are provided.

The operation of this pulse insert circuit is as follows: When alarm 34 indicates a fault condition, switch 42 is closed applying to the input of delay circuit 40 the leading flank of the pulse from the delay circuit 35 which opens switch 31. Unit 40 delays this flank by the time interval ($\delta_4$—$\delta_2$) and produces at its output a "synthetic" response signal of duration $\delta_2$ which is injected into the counter via switches 44, 41 and 31. The purpose of switch 41 is to stop the insertion of "synthetic" pulses into the counter 32 when the count has reached the number corresponding to the total number of positions to be supervised to which the fixed comparator 33 is preset.

The purpose of the further switch 44 inserted in the path of "synthetic" response signals and which is opened over line 45 is to inhibit the insertion of "synthetic" signals when "real" response signals appear at the output of the pulse regenerator 30.

It is to be understood that the foregoing description of specific examples of this invention is made by way of example and is not to be considered as a limitation on its scope.

We claim:

1. In a carrier current communication system including a pair of terminal stations interconnected by a transmission path and a plurality of repeater stations disposed in said path between said terminal stations, said path having a first frequency band to provide operation power for at least said repeater stations and a second frequency band for transmitting information signals, a system for supervising said repeaters comprising:

first means disposed in one of said terminal stations to generate an interrogation signal for transmission over said path in said first frequency band to the nearest one of said repeater stations without interrupting the transmission of said information signals through said repeater stations;

second means disposed in each of said repeater stations coupled to said path to extract said interrogation signal for said path;

third means disposed in each of said repeater stations coupled to said second means to delay said interrogation signal a predetermined interval of time;

fourth means disposed in each of said repeater stations coupled to said third means and said path to inject said delayed interrogation signal into said path for transmission over said path to the succeeding one of said stations;

fifth means disposed in each of said repeater stations coupled to said third means and said path responsive to said delayed interrogation signal to produce a response signal for transmission over said path in said second frequency band from the associated one of said repeat stations to said one of said terminal;

sixth means disposed in said one of said terminals coupled to said path responsive to a predetermined characteristic of said response signal received from each of said repeater stations; and seventh means disposed in said one of said terminals coupled to said sixth means to generate an alarm when said predetermined characteristic deviates by more than a given amount;

said second and fourth means each including power separating filter means to separate said first and second frequency bands;

further including a bandstop filter disposed in each of said repeater stations connected between said power separating filter means to prevent the direct transmission of said interrogation signal through each of said repeater stations;

said first and fourth means each including eight means to generate direct current pulses, and ninth means coupled to said eighth means to convert said direct current pulses into a wave having frequency components falling within said first frequency band to provide the appropriate one of said interrogation signal and said delayed interrogation signal;

said third means including a first monostable circuit coupled to the first of said power splitting filter means extracting said interrogation signal from said path, said first monostable circuit being triggered by said extracted interrogation signal and returning to its original state after said predetermined interval of time, and a second monostable circuit coupled in tandem with said first monostable circuit and to the second of said power splitting filter means to inject said delayed interrogation signal into said path, said second monostable circuit being triggered by the output signal of said first monostable circuit and returning to its original state after a given duration to produce said delayed interrogation signal; and said fifth means including an oscillator means providing an output signal having a frequency falling within said second frequency band, and first switch means coupled to said oscillator means, said second monostable circuit and said first of said power splitting filter means responsive to said delayed interrogation signal to connect said oscillator to said first of said power splitting filter means, said output signal of said oscillator means providing said response signal.

2. A system according to claim 1, wherein said sixth means includes:

rectifier means coupled to said path to rectify said response signal received from each of said repeater stations;

level discriminator means coupled to said rectifier means to allow only those output signals from said rectifier means having amplitudes within predetermined amplitude limits to pass therethrough;

counter means; and second switch means coupled to said discriminator means, said counter means and said eighth means to enable said counter means to count said response signals received from said rectifier means passed by said discriminator means, said second switch means being closed under control of said direct current pulses only during times when said response signals are expected to be received.

3. A system according to claim 2, wherein:

said counter means is coupled to said eighth means and is reset by said direct current pulses;

said seventh means includes first comparator means coupled to said counter means;

said first comparator means providing an alarm signal when the count of said counting means is less than a predetermined count occurring during the time interval between two adjacent ones of said direct current pulses; and alarm means coupled to said first comparator means responsive to said alarm signal to indicate a count less than said predetermined count.

4. A system according to claim 3, further including:

a second comparator means coupled to said counter means;

said second comparator means being set to produce a control signal in response to a count in said counter corresponding to said response signal received from a given one of said repeater stations;

peak reading measuring means to measure the amplitude of said response signal received from said given one of said repeater station; and third switch means coupled to said second comparator means, said rectifier means and said measuring means responsive to said control signal to couple said rectifier means to said measuring means.

5. A system according to claim 4, wherein the time constant of said measuring means equals or exceeds the time interval between two adjacent ones of said direct current pulses from said eighth means disposed in said one of said terminal stations and also said time constant exceeds the time required for said interrogation signal to travel between said terminal stations and the last of said response signals to return to said one of said terminal stations.

6. A system according to claim 5, further including:

tenth means disposed in said one of said terminal stations coupled to said eighth means of said one of said terminal stations, said counter means and said discriminator means to generate local response signals to replace those missing ones of said response signals from nondisabled ones of said repeater stations.

7. A system according to claim 6, further including:

a separate transmission path for each direction of transmission;

each of said separate paths including a plurality of repeaters;

an interrogating signal filter interconnecting each of said separate paths adjacent said other of said terminal stations; and a response signal filter interconnecting each of said separate paths adjacent said other of said terminal stations.